(12) United States Patent
Allezard et al.

(10) Patent No.: US 9,008,364 B2
(45) Date of Patent: Apr. 14, 2015

(54) METHOD FOR DETECTING A TARGET IN STEREOSCOPIC IMAGES BY LEARNING AND STATISTICAL CLASSIFICATION ON THE BASIS OF A PROBABILITY LAW

(75) Inventors: Nicolas Allezard, Paris (FR); Loïc Jourdheuil, Claye-Souilly (FR)

(73) Assignee: Commissariat A l'Energie Atomique et aux Energies Alternatives, Paris (FR)

( * ) Notice: Subject to any disclaimer, the term of this patent is extended or adjusted under 35 U.S.C. 154(b) by 223 days.

(21) Appl. No.: 13/809,871

(22) PCT Filed: Jul. 8, 2011

(86) PCT No.: PCT/EP2011/061612
§ 371 (c)(1),
(2), (4) Date: Jan. 28, 2013

(87) PCT Pub. No.: WO2012/007382
PCT Pub. Date: Jan. 19, 2012

(65) Prior Publication Data
US 2013/0114858 A1      May 9, 2013

(30) Foreign Application Priority Data
Jul. 13, 2010   (FR) ...................................... 10 02950

(51) Int. Cl.
*G06K 9/62*   (2006.01)
*G06K 9/32*   (2006.01)
*G06K 9/00*   (2006.01)

(52) U.S. Cl.
CPC ............ *G06K 9/3241* (2013.01); *G06K 9/6215* (2013.01); *G06K 9/6288* (2013.01); *G06K 9/00214* (2013.01)

(58) Field of Classification Search
None
See application file for complete search history.

(56) References Cited

U.S. PATENT DOCUMENTS 8,594,425 B2 * 11/2013 Gurman et al. ................ 382/173
2009/0074245 A1 * 3/2009 Smilansky ..................... 382/103

OTHER PUBLICATIONS

A. Ess, et al., "Improved Multi-Person Tracking with active Occlusion Handling", 2009 Proceedings of the IEEE ICRA, Workshop on People Detection and Tracking, May 2009, Kobe, Japan, 6 pages.

(Continued)

*Primary Examiner* — Jon Chang
(74) *Attorney, Agent, or Firm* — Baker & Hostetler LLP

(57) ABSTRACT

A method for the detection of a target present in at least two images of the same scene acquired simultaneously by different cameras comprises, under development conditions, a prior target-learning step, said learning step including a step of modeling of the data X corresponding to an area of interest in the images by a distribution law P such that $P(X)=P(X_{2d}, X_{3d}, X_T)=P(X_{2d})P(X_{3d})P(X_T)$ where $X_{2d}$ are the luminance data in the area of interest, $X_{3d}$ are the depth data in the area of interest, and $X_T$ are the movement data in the area of interest. The method also comprises, under operating conditions, a simultaneous step of classification of objects present in the images, the target being regarded as detected when an object is classified as being one of the targets learnt during the learning step. Application: monitoring, assistance and security on the basis of stereoscopic images.

4 Claims, 2 Drawing Sheets

(56) References Cited

OTHER PUBLICATIONS

Stefan Walk, et al, "New Features and Insights for Pedestrian Detection", 2010 IEEE Conference on Cumputer Vision and Pattern Recognition, Jun. 13, 2010, p. 1030-1037, IEEE, XP031725929.

Liang Zhao, et al, "Stereo- and Neural Network-Based Pedestrian Detection", IEEE Transactions on Intelligent Transportation Systems, Sep. 1, 2000, vol. 1, No. 3, IEEE Piscataway, NJ, USA, SP011028377.

M.E. Diaz, et al., "A Gray-Level 2D Feature Detector Using Circular Statistics", Pattern Recognition Letters, Nov. 1, 1997, pp. 1083-1089vol. 18, No. 11-13, Elsevier, Amsterdam, NL, XP004117905.

Yassine Benabbas, et al, "Global Analysis of Motion Vectors for Event Detection in Crowd Scenes", Proceedings 11th IEEE International Workshop on Performance of Tracking and Surveillance, Jun. 25, 2009, pp. 109-116, XP002630185.

I. Ulusoy, et al., "A Statistical Approach to Sparse Multi-Scale Phase-Based Stereo", Pattern Recognition, May 3, 2007, pp. 2504-2520, vol. 40, No. 9, Elsevier, GB, XP022058964.

Stefan Walk, et al, "Disparity Statistics for Pedestrian Detection: Combining Appearance, Motion and Stereo", 11th European Conference on Computer Vision, Sep. 5, 2010, XP019150792.

\* cited by examiner

METHOD FOR DETECTING A TARGET IN STEREOSCOPIC IMAGES BY LEARNING AND STATISTICAL CLASSIFICATION ON THE BASIS OF A PROBABILITY LAW

CROSS-REFERENCE TO RELATED APPLICATIONS

This application is a National Stage of International patent application PCT/EP2011/061612, filed on Jul. 8, 2011, which claims priority to foreign French patent application No. FR 1002950, filed on Jul. 13, 2010, the disclosures of which are incorporated by reference in their entirety.

FIELD OF THE INVENTION

The present invention relates to a method for detecting and recognizing targets in stereoscopic images. It can be applied notably in any domain using a pair of stereoscopic cameras to detect objects. It may involve, for example, monitoring, assistance or security applications on board a vehicle.

BACKGROUND

The general problem is to search in images for the presence of targets of various types, which may be objects or persons, the targets presenting certain characteristics conforming to a model. For example, it may involve a parametric model, such as a ratio between width and height, which must have a given value $\lambda$, or a three-dimensional CAD model.

A method of this type for detecting targets based on a model becomes difficult to carry out in the event of substantial variability of appearance of the targets. For example, the appearance of a person may vary substantially according to his posture or clothing. The method may even become impossible to carry out. For example, the operator of a parking area will have immense difficulty in detecting trucks when he does not have the CAD models of the different types of truck.

In these cases where the modeling of targets proves difficult or even impossible, a known solution consists in carrying out a statistical learning step OFF-LINE, i.e. prior to the operation of the detection system, and a classification step ON-LINE, i.e. simultaneously with the operation of the detection system. In fact, the classification step forms an integral part of the detection process: if a system for detecting pedestrians is considered, a detection takes place when a target has been classified as a "pedestrian".

The prior statistical learning step consists in learning to recognize targets using an algorithm which automatically extracts the most relevant parameters of the targets in order to distinguish them from the other elements which may be present in the images. This in fact involves creating statistical models of data extracted from a collection of "typical" images of targets. These statistical models are used later during the simultaneous classification step. The simultaneous classification step is carried out in real time on the images most recently supplied by the cameras. It involves comparing new data extracted from the "real" images with the statistical models during the learning step on the basis of "typical" images.

Thus, systems already allow the detection and recognition of stationary or mobile objects or persons using pairs of images supplied by calibrated cameras forming a stereoscopic head, for example two horizontally disposed cameras.

A system of this type first calculates a disparity map for each pair of images, representing the difference between the left image and the right image. More exactly, the disparity is the difference in pixel position between two images for the same observed point of the scene. Through triangulation, this deviation allows the z coordinate of the pixels of the image to be calculated and therefore depth information (3D) on the observed scene to be obtained. Sometimes represented by grey levels, a disparity map of this type is also generally referred to as a disparity image.

A system of this type then models the appearance of the objects present in the image during a statistical learning process. This process is based on a set of descriptors calculated in the image, such as the grey levels, the RGB (Red-Green-Blue) data, the successive derivatives of the signal, convolutions by a set of specific filters or histograms.

Finally, the video flows supplied by the two cameras allow a map to be calculated of the estimated 2D positions of the pixels for each of the two left and right cameras. This information is important for distinguishing moving objects. It allows better segmentation of the objects, notably when the camera is stationary or when the movement of the objects is sufficiently different from that of the camera, such as, for example, a pedestrian crossing the road in front of a moving automobile carrying the cameras.

For example, the article "Improved Multi-Person Tracking with Active Occlusion Handling" (A. Ess, K. Schindler, B. Leibe, L. van Gool, ICRA Workshop on People Detection and Tracking, May 2009) describes such a method of detection, recognition and even tracking of objects using a stereoscopic head. It carries out a plurality of steps to integrate the previously described luminance, position and depth information. This method is based on the prior detection of areas of interest and on the representation of these areas by a dictionary of elementary patterns. The learning step comprises a learning step of a "Codebook of Local Appearance", which is a dictionary of elementary visual patterns which may be encountered on objects, and a learning step of "Implicit Shape Models", which are the relative positions of these elementary patterns on the objects. During the classification step aiming to detect objects, a first detector searches, in the images and on the basis of the dictionary, for areas of interest likely to contain objects, then a second detector searches for objects in the areas of interest. Finally, a voting mechanism allows recognition of the objects.

A major disadvantage of this method is that it is based on a plurality of successive pre-detection steps, firstly pre-detection of areas of interest, then of objects in the areas of interest and then only recognition of the objects through classification. A significant number of non-detections may result from this, as these successive pre-detection steps are based in a certain manner on an "all or nothing" mechanism: if an upstream step yields a negative result, the downstream steps are not even carried out, even though they could have proven effective in "correcting" the non-detection of the upstream step. And if, in order to attempt to weaken this "all or nothing" mechanism, the number of areas of interest is increased, a veritable explosion in calculation times then occurs.

SUMMARY OF THE INVENTION

The object of the invention is notably to limit the non-detections by avoiding concatenation of multiple pre-detection phases during the classification phase. To do this, the invention proposes notably a statistical learning method for objects, allowing fusion at a low level of the luminance, movement and depth information on the objects. For this purpose, the subject-matter of the invention is a method for detecting a target present in at least two images of the same scene acquired simultaneously by different cameras. The method comprises a prior step of learning of targets under development conditions and, under operating conditions, a simultaneous step of classification of objects present in the images, the target being regarded as detected when an object is classified as being one of the targets learnt during the learning step. The target-learning step includes a step of modeling of the data X corresponding to an area of interest in the images by a distribution law P such that $P(X)=P(X_{2d}, X_{3d}, X_T)=P(X_{2d})P(X_{3d})P(X_T)$ where $X_{2d}$ are the luminance data in the area of interest, $X_{3d}$ are the depth data in the area of interest, and $X_T$ are the movement data in the area of interest.

In one preferred embodiment, the modeling step may comprise a step of calculation, in each pixel of the area of interest in one of the two images, of the values dx and dy of the derivatives of the pixel luminance according to two orthogonal directions, $P(X_{2d})$ being able to be a Von Mises-Fisher law on the unit sphere of $\Re^3$ with a concentration index $k_{2d}$ and a mean vector $\mu_{2d}$, $P(X_{2d})$ describing the distribution of the normal unit vectors on the planes of equation z=dx.x+dy.y corresponding to all of the pixels of the area of interest.

In one preferred embodiment, the modeling step may also comprise a step of calculation, in each pixel of the area of interest in one of the two images, of the values mx and my of the derivatives of the pixel position according to two orthogonal directions, $P(X_T)$ being able to be a Von Mises-Fisher law on the unit sphere of $\Re^3$ with a concentration index $k_T$ and a mean vector $\mu_T$, $P(X_T)$ describing the distribution of the normal unit vectors on the planes of equation z=mx.x+my.y corresponding to all of the pixels of the area of interest.

In one preferred embodiment, the modeling step may also comprise a step of calculation, in each pixel of the area of interest in the disparity image corresponding to the two images, of the values px and py of the derivatives of the pixel depth according to two orthogonal directions, $P(X_{3d})$ being able to be a Von Mises-Fisher law on the unit sphere of $\Re^3$ with a concentration index $k_{3d}$ and a mean vector $\mu_{3d}$, $P(X_{3d})$ describing the distribution of the normal unit vectors on the planes of equation z=px.x+py.y corresponding to all of the pixels of the area of interest.

Advantageously, since a unit vector has coordinates ($\alpha,\beta$) in the unit sphere of $\Re^3$, the Von Mises-Fisher law may be $\alpha$-periodic and/or $\beta$-periodic with a period $$\frac{2\pi}{n},$$

where n is an integer.

In a different embodiment, $P(X_{3d})$ may be a normal law with a standard deviation $\sigma_{3d}$ and a mean $\mu_{3d}$, $P(X_{3d})$ describing the distribution of the pixel depth in the area of interest.

For example, the area of interest may be chosen using a boosting classifier.

The main advantage of the present invention is also that it does not cause an increase in the false alarm rate for the same detection rate. Moreover, presenting a reasonable complexity, it can be implemented on even the lightest-duty equipment.

BRIEF DESCRIPTION OF THE DRAWINGS

Other characteristics and advantages of the invention will become evident from the description which follows, given with reference to the attached drawings, in which.

DETAILED DESCRIPTION

The present invention proposes to fuse the data at the lowest level in order to permit a joint learning of the 2D luminance information $X_{2d}$, the 3D depth information $X_{3d}$ and the temporal movement information $X_T$. To do this, an image is created of which each pixel contains all of the basic data X calculated on the basis of the information originating from the three sources. The data fusion is carried out using a law P of joint probability between the data $X_{2d}$, $X_{3d}$ and $X_T$ which are assumed to be independent, i.e. such that:

$$P(X)=P(X_{2d},X_{3d},X_T)=P(X_{2d})P(X_{3d})P(X_T)$$

Thus, the data X originating from any rectangular area of interest of the image can be modeled by this law P fusing the information relating to luminance $X_{2d}$, depth $X_{3d}$ and movement $X_T$.

The following description corresponds to an example embodiment of the invention based on a left image and a right image supplied by two horizontally disposed cameras. In this embodiment, the luminance, depth and movement data of the pixels of a rectangular area of interest of the image can advantageously be represented by a descriptor which can be calculated at low cost, i.e. in vectors with characteristics $\overrightarrow{X_{2d}X_{3d}X_T}$ ready to be compared.

In fact, the data of the luminance and movement signal of the pixels, which are both 2D vector data, can both be modeled by a probability law on 3D spherical data.

Figure 1B:
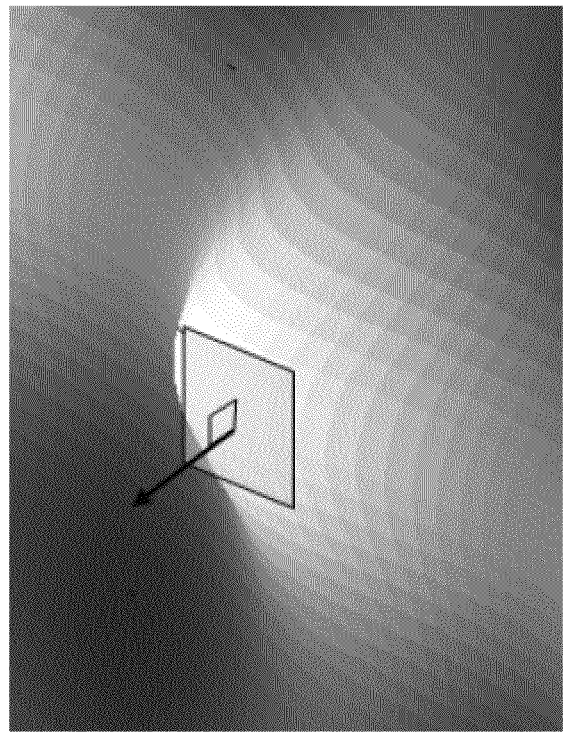
FIGS. 1a and 1b show, via a 2D image and a 3D image respectively, an example of a 2D image in grey levels and its interpretation, according to the invention, as a 3D surface.
Figure 1A:
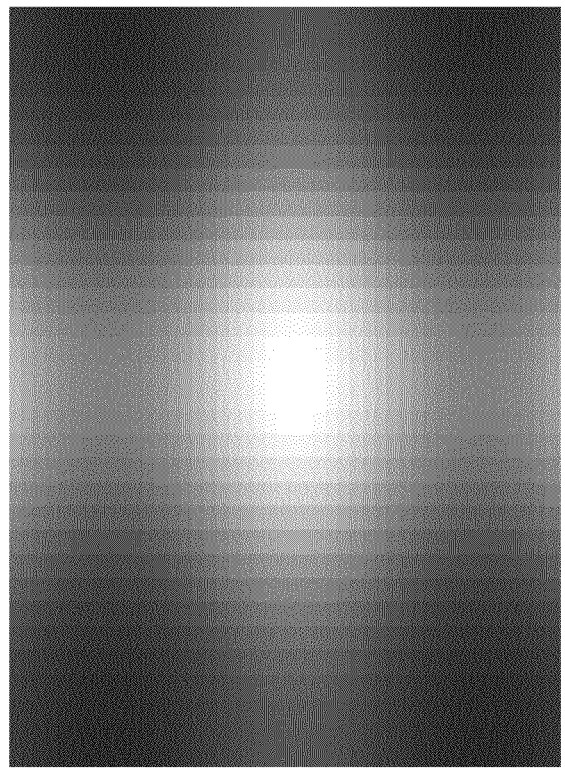

On the one hand, the luminance signal can advantageously be represented by derivatives in relation to two orthogonal directions of the plane of the image. By way of illustration, the 2D image in grey levels shown in FIG. 1a, each grey level translating a luminance value of a pixel, can be interpreted as a surface, as shown in FIG. 1b, of which the heights in a direction Z are given by the luminance of the pixels. Thus, at any point of the surface, it is possible to construct the plane tangential to the surface, the plane of equation z=a.x+b.y, where a=dx is the value of the derivative of the luminance in relation to a direction X at the point considered and b=dy is the value of the derivative of the luminance in relation to a direction Y at the point considered. From this tangential plane, it is simple to deduce the normal unit vector on the surface at the point considered, which is orthogonal to the plane. Thus, the luminance information of a pixel can be described by this first unit vector. For example, the calculation of the derivative of the luminance signal can easily be carried out using a 2D convolution mask, in the right image for example. This therefore involves a conventional image processing operation.

Moreover, in a similar manner, the movement of a pixel between two temporarily successive images can itself also be advantageously represented by its derivatives in relation to two orthogonal directions of the image plane, and can allow the construction of a tangential plane at any point on a pseudo-surface, plane of equation z=a.x+b.y, where a=mx is the value of the derivative of the position in relation to a direction X at the point considered and b=my is the value of the derivative of the position in relation to a direction Y at the point considered, and can also allow the construction of the normal unit vector on the pseudo-surface at the point considered. Thus, information on the movement of a pixel can be described by this second unit vector. For example, the calculation of the movement of the pixels between a time t−1 and a time can easily be made through correlation, in the right image, for example. This therefore involves a conventional image processing operation.

It must be noted that the invention allows not only the direction of the 2D vectors but also their magnitudes to be modeled in the same law.

Finally, again in a similar manner, the depth of a pixel can itself also be advantageously represented by its derivatives in relation to two orthogonal directions of the image plane and can be described by a unit vector tangential to a plane of equation z=a.x+b.y, where a=px is the value of the derivative of the depth in relation to a direction X to the pixel considered and b=py is the value of the derivative of the depth in relation to a direction Y to the pixel considered. It must be noted that a plurality of prior operations are carried out on the left and right images: rectification of the left and right images for the calculation of the disparity map, calculation of the disparity between the right and left image through correlation and, finally, calculation of the depth map of the right image. This therefore involves conventional image processing operations.

Thus, the luminance, depth and movement data can be transformed in such a way that they are each represented by a 3D point on the unit sphere, i.e. by three pairs of angles $(\alpha,\beta)$ for the data originating from the three sources.

The distribution of these points on the unit sphere can be effectively modeled by a Von Mises-Fisher law P with a real concentration index k and a mean vector $\mu$ on the unit sphere:

$$P(X/k, \mu) = \frac{k}{4\pi \sinh(k)} e^{(k\mu^T X)}$$

where sin h designates the hyperbolic sine function and $\mu^T$ designates the transposed vector of $\mu$. Assuming X=$(\alpha,\beta)$ and $\mu=(\alpha_\mu,\beta_\mu)$, the law P is therefore given by:

$$P(X/k, \mu) = \frac{k}{4\pi \sinh(k)} e^{k(\cos(\beta_\mu)\times\cos(\beta)+\sin(\beta_\mu)\sin(\alpha_\mu)\times\sin(\beta)\sin(\alpha)+\sin(\beta_\mu)\cos(\alpha_\mu)\times\sin(\beta)\cos(\alpha))}$$

In total, the probability law P representing the data of one of the sources can therefore be modeled by three scalar values: the real index k and the two angles $\alpha_\mu$ and $\mu_\mu$. Furthermore, P is $\alpha$-periodic and $\beta$-periodic with a period of $2\pi$.

However, such a law P is unimodal and is therefore poorly adapted to the sets of points presenting a plurality of modes or concentration points. To overcome this disadvantage, and rather than conventionally implementing a mixture of laws which is very costly in calculation time over an entire image, the present invention advantageously proposes to use a plurality of laws of different periods. More precisely, the luminance data $X_{2d}$ of each area of interest considered can be modeled by a plurality of periodic probability laws, the periods of which differ from one another. The same applies to the modeling of the depth data $X_{3d}$ and the modeling of the movement data $X_T$. This allows the calculation time to be drastically reduced. These periodic probability laws can be Von Mises-Fisher laws. In fact, it is possible to define Von Mises-Fisher laws which are $\alpha$-periodic or $\beta$-periodic with a period of $$\frac{2\pi}{n},$$

where n is an integer. For example, the Von Mises-Fisher law with an $\alpha$-period of $$\frac{2\pi}{n}$$

is given by:

$$P(X|k,\mu,n)=cst\, e^{k(\cos(\beta_\mu)\times\cos(\beta)+\sin(\beta_\mu)\sin(\beta)\times\sin(n\alpha_\mu)\sin(n\alpha)+\sin(\beta_\mu)\sin(\beta)\times\cos(n\alpha_\mu)\cos(n\alpha))}$$

where cst designates a real constant. The different periods for each type of data are thus determined by the number n. For each type of data (luminance, depth, movement), the different periodic probability laws are combined in such a way as to form only a single probability law $P(X_{2d})$, $P(X_{3d})$ or $P(X_T)$. Assuming that the laws of different periods are independent from one another, a joint distribution law using N laws of different periods, where N is an integer, to describe the pixels of a rectangular area of interest of the image, each law $P(X_{2d})$, $P(X_{3d})$ or $P(X_T)$ can be the product of the different periodic probability laws:

$$P(X/k, \mu) = \prod_{j=1}^{N} P(X_j/k_j, \mu_j, n_j)$$

where k and $\mu$ designate vectors bringing together all of the parameters of the N distribution laws.

It must be noted that, if the data $X_{3d}$ are of poor quality, $P(X_{3d})$ can be a normal law with a standard deviation $\sigma_{3d}$ and a mean $\mu_{3d}$ defined by:

$$P(X_{3d}/\sigma_{3d}, \mu_{3d}) = \frac{1}{2\pi\sqrt{\sigma_{3d}}} e^{-\frac{1}{2}\frac{(x_{3d}-\mu_{3d})^2}{\sigma_{3d}^2}}$$

The present invention also proposes a method for choosing the most relevant areas for the recognition of targets, i.e. the rectangular areas of interest which must be described by a joint law as previously explained. For this purpose, the invention advantageously proposes a boosting classifier, and a relevant metric between such descriptors.

Boosting techniques combine learning methods which allow a strong classifier to be constructed on the basis of a plurality of weak classifiers. This is an iterative algorithm which chooses a new weak classifier in an optimum manner on each loop. The weak classifier implements an input space partition. The value forwarded by the classifier is a function of the area in which the point represented by the data $X_{2d}$, $X_{3d}$ and $X_T$ is located. A classification score indicates which object class is the most likely according to the data.

At the end of the learning step, a set of luminance, depth and movement descriptors is obtained on the basis of a collection of examples of images representing objects O of which the classes are known. A weighting $w_i$, which varies throughout the algorithm, is allocated to each example. The parameters of the probability laws $P(X_{2d}/O,w_i)$, $P(X_{3d}/O,w_i)$, and $P(X_T/O,w_i)$ of the data knowing the classes are calculated and weighted by $w_i$. The votes of the weak classifier are calculated according to the different space partitions which it implements and as a function of the weighting of the examples.

During the classification step, once the vector of the area of the image is calculated, the log-likelihood $L(Z/O_j)$ is calculated for the different objects $O_j$. The probabilities $P(O_j/Z)$ are then calculated using the Bayes rule. Advantageously, the chosen area of interest may be the area associated with the class j for which the probability $P(O_j/Z)$ is the greatest. The classifier forwards the calculated score at the learning. The scores of all of the local classifiers/descriptors are added together to produce the final score of the area of interest.

Figure 2:
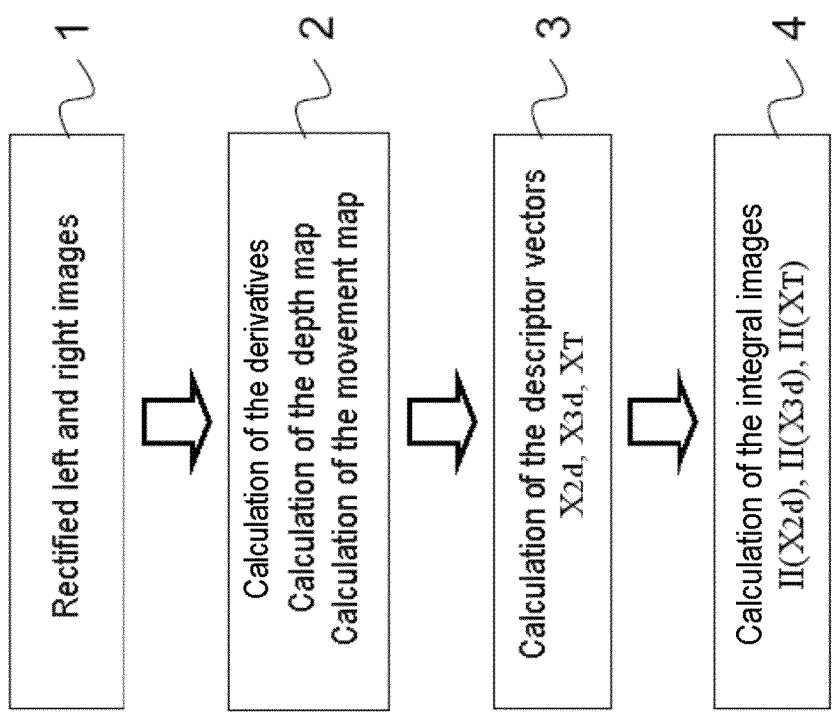
FIG. 2 shows, via a sequence diagram, an example embodiment of the invention.

FIG. 2 shows, via a diagram, an example of a sequence of steps allowing the implementation of the invention on the basis of the left image and right image supplied by the two horizontally disposed cameras. Firstly, the left and right images can be rectified during a step 1. The disparity between the right and left image, the depth map of the right image, the derivative of the luminance signal and the movement of the pixels can then be calculated during a step 2. Then, during a step 3, each pixel i of the right image can be associated with a vector containing the depth of the pixel i ($z_i$), the derivative of the luminance signal on the pixel i following the lines and columns ($Dx_i$ and $Dy_i$) of the image and the movement of the pixel i between times t−1 and t ($mx_i$ and $my_i$). Finally, during a step 4, integral images can be calculated to allow fast summations. Steps 1, 2, 3 and 4 are detailed in the continuation of the present application.

As previously explained, in order to model an area Z of the image according to the invention, all of the data $X_{2d}$, $X_{3d}$ and $X_T$ of said area Z are modeled by a probability law. Then, during the detection process, the data originating from an area of the image are compared with the calculated probability laws for each object class. The probability that all of the data $X_i$ of the pixels of the area Z have originated from the probability law associated with an object O is given by:

$$P(Z/O) = \prod_i P(X_i/O) = \prod_i (P(X_{2d}i/O)P(X_{3d}i/O)P(X_Ti/O))$$

The logarithm of this probability is given by:

$$L(Z/O) = \ln\left(\prod_i P(Xi/O)\right) =$$
$$\sum_i \ln\left(P(Xi/O)\right) = \sum_i \ln\left(P(X_{2d}i/O)P(X_{3d}i/O)P(X_Ti/O)\right)$$
$$L(Z/O) = \sum_i \ln(P(X_{2d}i/O)) + \sum_i \ln(P(X_{3d}i/O)) + \sum_i \ln(P(X_Ti/O))$$

With the following formulae for each probability law:

$$P(X_{3d}/\sigma_{3d}^O, \mu_{3d}^O) = \frac{1}{2\pi\sqrt{\sigma_{3d}^O}} e^{-\frac{1}{2}\frac{(x_{3d}-\mu_{3d}^O)^2}{\sigma_{3d}^{O2}}}$$

$$P(X_{2d}/k_{2d}^O, \mu_{2d}^O) = \frac{k_{2d}^O}{4\pi \sinh(k_{2d}^O)} e^{(k_{2d}^O \mu_{2d}^{Ot} x_{2d})}$$

$$P(X_T/k_T^O, \mu_T^O) = \frac{k_T^O}{4\pi \sinh(k_T^O)} e^{(k_T^O \mu_T^{Ot} x_T)}$$

-continued $$\sum_i \ln(P(X_{2d}i/O)) = \sum_i \ln\left(\frac{k_{2d}^O}{4\pi\sinh(k_{2d}^O)}\right) + \sum_i k_{2d}^O \mu_{2d}^{Ot} x_{2d}i$$
$$= N \times \ln\left(\frac{k_{2d}^O}{4\pi \sinh(k_{2d}^O)}\right) + k_{2d}^O \mu_{2d}^{Ot} \sum_i x_{2d}i$$

$$\sum_i \ln(P(X_Ti/O)) = \sum_i \ln\left(\frac{k_T^O}{4\pi\sinh(k_T^O)}\right) + \sum_i k_T^O \mu_T^{Ot} x_T i$$
$$= N \times \ln\left(\frac{k_T^O}{4\pi \sinh(k_T^O)}\right) + k_T^O \mu_T^{Ot} \sum_i x_T i$$

Finally, the calculation of $L(Z/O_j)$ requires the calculation of the sums of the vectors $X_{2d}i$ and $X_Ti$ for the 2D and movement sources, the scalar values $z_i$ and $z_i^2$ for the 3D source in the area in question, then the calculation of the scalar product between the sum vectors obtained and a parameter vector for each object class to be considered.

The data $\vec{d}_{2d}$, $\vec{d}_T$ and $\vec{d}_{3d}$ originating from the calculation of the derivative, the disparity and the movement map respectively are then transformed in order to be compared with the different object models. At the outset, these data are in the following form:

$$\vec{d}_{2d} = \begin{bmatrix} d_x \\ d_x \\ Z_{2d} \end{bmatrix}$$

$$\vec{d}_T = \begin{bmatrix} m_x \\ m_x \\ Z_T \end{bmatrix}$$

$$d_{3d} = z_{3d}$$

They are transformed into $$x_{2d} = \frac{\vec{d}_{2d}}{\|\vec{d}_{2d}\|},$$

$$x_T = \frac{\vec{d}_T}{\|\vec{d}_T\|}$$

and $$x_{3d} = \begin{bmatrix} z_{3d} \\ z_{3d}^2 \end{bmatrix},$$

wherefore:

$$\vec{x}_{2d} = \begin{bmatrix} \frac{d_x}{\sqrt{d_x^2 + d_y^2 + Z_{2d}^2}} \\ \frac{d_y}{\sqrt{d_x^2 + d_y^2 + Z_{2d}^2}} \\ \frac{Z_{2d}}{\sqrt{d_x^2 + d_y^2 + Z_{2d}^2}} \end{bmatrix} = \begin{bmatrix} \cos(\beta_{2d}) \\ \sin(\beta_{2d})\sin(\alpha_{2d}) \\ \sin(\beta_{2d})\cos(\alpha_{2d}) \end{bmatrix}$$

-continued $$\vec{x_T} = \begin{bmatrix} \dfrac{m_x}{\sqrt{m_x^2 + m_y^2 + Z_T^2}} \\ \dfrac{m_y}{\sqrt{m_x^2 + m_y^2 + Z_T^2}} \\ \dfrac{Z_T}{\sqrt{m_x^2 + m_y^2 + Z_T^2}} \end{bmatrix} = \begin{bmatrix} \cos(\beta_T) \\ \sin(\beta_T)\sin(\alpha_T) \\ \sin(\beta_T)\cos(\alpha_T) \end{bmatrix}$$

$$\vec{x_{3d}} = \begin{bmatrix} \dfrac{dz_x}{\sqrt{dz_x^2 + dz_y^2 + Z_{3d}^2}} \\ \dfrac{dz_y}{\sqrt{dz_x^2 + dz_y^2 + Z_{3d}^2}} \\ \dfrac{Z_{3d}}{\sqrt{dz_x^2 + dz_y^2 + Z_{3d}^2}} \end{bmatrix} = \begin{bmatrix} \cos(\beta_{3d}) \\ \sin(\beta_{3d})\sin(\alpha_{3d}) \\ \sin(\beta_{3d})\cos(\alpha_{3d}) \end{bmatrix}$$

It must be noted that these transformations can be performed very quickly and differ little from conventional image-processing operations. In fact, $d_x^2 + d_y^2$ corresponds to the calculation of the magnitude of the gradient squared. During the transformation, a constant $Z_{2d}$ is added to the magnitude squared before calculating its route. This constant allows the transformation to be more finely parameterized according to the magnitude values typically encountered in images. It allows the transformation to be adapted to magnitude values which are too high or too low.

The integral images of these data are then calculated to allow their fast summations. The calculation of the sum of a vector of size n in an area of any size of the image is thus carried out at a fixed cost, requiring only n°×°2 additions, n subtractions and 4°×°n accesses to the data of the images. It must be noted that, in the case of a conventional calculation, the number of operations depends on the surface of the area and becomes prohibitive from 10°×°10 pixels.

During the detection phase, the image is passed through by an area of interest of which the positions and sizes are a function of the ground plane. A 3D interest box is defined in the scene. This 3D box will be moved successively over a set of candidate positions to contain the object(s) searched for.

For each position, the projection of the 3D box is calculated and a vector describing the content of the 2D area is calculated. A recognition test is then carried out on these data. The calculation of the likelihood function between local descriptors and the models resulting from the learning is carried out via the summation of the descriptive vectors in the area in question. These sums are calculated using the technique of integral images which allow sums of values to be effectively calculated over a 2D area. Finally, the area is added to the list of positive areas or it is rejected.

The previously described invention also has the main advantage of providing a more faithful and yet simpler model of the luminance, depth or pixel movement data extracted from the different images. The probability law used for the 2D vectors, i.e. the image signal and the movement in the image, allow the modeling of a source by only three parameters, i.e. two angles and one concentration parameter, while being more efficient than a conventional linear or circular joint law.

Moreover, for a fast detection, it fuses the 3D, 2D and movement information at the lowest level in the local descriptors, the most relevant descriptors then being chosen by the boosting algorithm during the learning phase. Moreover, the classifiers are organized there in a cascade, the stages of which are increasingly complex. This technique allows the search to be speeded up, since the most complex tests are applied only to the most ambiguous areas of the image. The invention thus proposes a very simple and very regular process which can be effectively implemented on commercially available computers and on dedicated architectures.

Finally, the previously described invention is applicable to all types of target recognition applications based on the use of stereoscopic video sensors and the use of a statistical classification method comprising a prior learning phase followed by a simultaneous detection phase. This may involve, for example, monitoring applications, such as the monitoring of an area in front of or behind a vehicle to avoid collisions, monitoring of an area of a building, assistance to disabled persons or the navigation of autonomous mobile robots.

The invention claimed is:

1. A method for detecting a target present in at least two images of a same scene acquired simultaneously by different cameras, the method comprising:
   under development conditions, a target-learning step carried out at a computer coupled to the different cameras;
   under operating conditions, a step of classification of objects present in the images acquired by the different cameras and provided to the computer, said step of classification being carried out at the computer, the target being regarded as detected when an object is classified as being one of the targets learnt during the target-learning step,
   wherein the target-learning step includes a step of modeling, at the computer, of data X corresponding to an area of interest in the images captured by the different cameras by a parametric distribution law P such that $P(x)=P(X_{2d},X_{3d},X_T)=P(X_{2d})P(X_{3d})P(X_T)$ where $X_{2d}$ are luminance data in the area of interest, $X_{3d}$ are depth data in the area of interest, and $X_T$ are movement data in the area of interest, the modeling step comprising a step of calculation, at the computer, in each pixel of the area of interest in one of at least two of the different images, of values dx and dy, said dx and dy being derivatives of a pixel luminance in two orthogonal directions x and y, respectively,
   the luminance data $X_{2d}$ of the area of interest being modeled by a plurality of α-periodic and/or β-periodic Von Mises-Fisher laws at the computer, periods of said Von Mises-Fisher laws differ from one another, each said Von Mises-Fisher law describing a distribution of normal unit vectors on planes of an equation z=dx.x+dy.y corresponding to all of the pixels of the area of interest, being a multiplication operator in the equation, $P(X_{2d})$ being obtained at the computer by a product of the Von Mises-Fischer laws modeling the luminance data $X_{2d}$, said product being determined at the computer; and
   detecting, at the computer, said target among the objects in the images based upon said target-learning step and said step of classification.

2. The method as claimed in claim 1, in which the step of modeling comprises a step of calculation by the computer, in each pixel of the area of interest in one of the at least two images, of values mx and my of movements of a pixel position according to the two orthogonal directions in relation to a preceding image, the movement data $X_T$ of the area of interest being modeled, at the computer, by a plurality of α-periodic and/or β-periodic Von Mises-Fisher laws, the periods of which differ from one another, each said Von Mises-Fisher law describing a distribution of normal unit vectors on planes of an equation z=mx.x+my.y corresponding to all of the pixels of the area of interest, being a multiplication operator in the equation, $P(X_T)$ being obtained at the computer by product of the Von Mises-Fisher laws modeling the movement data $X_T$.

3. The method as claimed in claim 1, in which the step of modeling comprises a step of calculation by the computer, in each pixel of the area of interest in a disparity image corresponding to the at least two images, of values px and py, said px and py being of the derivatives of a pixel depth in the two orthogonal directions, the depth data $X_{3d}$ of the area of interest being modeled, at the computer, by a plurality of α-periodic and/or β-periodic Von Mises-Fisher laws, the periods of which differ from one another, each said Von Mises-Fisher law describing a distribution of normal unit vectors on planes of an equation z=px.x+py.y corresponding to all of the pixels of the area of interest, being a multiplication operator in the equation, $P(X_{3d})$ being obtained at the computer by a product of the Von Mises-Fisher laws modeling the depth data $X_{3d}$.

4. The method as claimed in claim 1, in which the area of interest is chosen by using a boosting classifier in the computer.

\* \* \* \* \*